(12) United States Patent
Liu (10) Patent No.: US 11,419,176 B2
(45) Date of Patent: Aug. 16, 2022

(54) DATA TRANSMISSION METHOD AND APPARATUS

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 3 days.

(21) Appl. No.: 16/918,334

(22) Filed: Jul. 1, 2020

(65) Prior Publication Data

US 2020/0337106 A1    Oct. 22, 2020

Related U.S. Application Data

(63) Continuation of application No. PCT/CN2018/071850, filed on Jan. 9, 2018.

(51) Int. Cl.
*H04W 76/22*    (2018.01)
*H04W 4/08*    (2009.01)
*H04W 28/02*    (2009.01)

(52) U.S. Cl.
CPC ............. *H04W 76/22* (2018.02); *H04W 4/08* (2013.01); *H04W 28/0205* (2013.01); *H04W 28/0215* (2013.01)

(58) Field of Classification Search
CPC ... H04W 76/22; H04W 4/08; H04W 28/0205; H04W 28/0215
See application file for complete search history.

(56) References Cited

U.S. PATENT DOCUMENTS

| 2012/0202543 | A1* | 8/2012 | Murias | H04W 68/00 |
| | | | | 455/515 |
| 2016/0197488 | A1* | 7/2016 | Hada | H02J 7/025 |
| | | | | 307/104 |
| 2017/0012821 | A1* | 1/2017 | Sa | G06F 13/14 |
| 2017/0094581 | A1* | 3/2017 | Sun | H04L 61/2503 |

(Continued)

FOREIGN PATENT DOCUMENTS

| CN | 104902443 A | 9/2015 |
| CN | 105472742 A | 4/2016 |

(Continued)

OTHER PUBLICATIONS

European Search Report for Application 18900305.6 dated Jan. 11, 2021.

(Continued)

*Primary Examiner* — Ajay Cattungal (74) *Attorney, Agent, or Firm* — Young Basile Hanlon & MacFarlane, P.C.

(57) ABSTRACT

Disclosed in the present disclosure are a data transmission method and apparatus. The method comprises: a network device sends data to a target terminal, and instructs the target terminal to send the data to a first device group, wherein the first device group comprises at least two terminals; the target terminal receives the data sent by the network device; and the target terminal sends the data to the first device group on the basis of the instruction of the network device, wherein the first device group comprises at least two terminals.

16 Claims, 3 Drawing Sheets

(56) References Cited

U.S. PATENT DOCUMENTS

| | | | | |
|---|---|---|---|---|
| 2017/0094604 A1* | 3/2017 | Yang | ................ | H04W 72/1284 |
| 2017/0201854 A1* | 7/2017 | Choi | ................ | H04W 72/0406 |
| 2019/0052703 A1* | 2/2019 | Tsai | ..................... | H04L 12/66 |
| 2019/0178657 A1* | 6/2019 | Benbrahim | ............ | G06Q 50/01 |

FOREIGN PATENT DOCUMENTS

| | | |
|---|---|---|
| CN | 105684549 A | 6/2016 |
| EP | 3229551 A1 | 10/2017 |
| EP | 3404997 A1 | 11/2018 |
| WO | 2017026791 A1 | 2/2017 |
| WO | 2017173614 A1 | 10/2017 |

OTHER PUBLICATIONS

3GPP TSG SA Meeting #76; Jun. 7-9, 2017, West Palm Beach, Florida, USA; TD SP-170384.

3GPP TS 23.303 V13.2.0 (Dec. 2015); 3rd Generation Partnership Project; Technical Specification Group Services and System Aspects; Proximity-based services (ProSe); Stage 2 (Release 13).

3GPP TS 23.501 V1.0.0 (Jun. 2017); 3rd Generation Partnership Project; Technical Specification Group Services and System Aspects; System Architecture for the 5G System; Stage 2 (Release 15).

3GPP TSG-RAN WG2 #89bis; R2-151290; Brastislava, Slovakia, Apr. 20-24, 2015.

International Search Report for PCT/CN2018/071850 dated Oct. 18, 2018.

* cited by examiner

A network device sends data to a target terminal and indicates the target terminal to send the data to a first device group, wherein the first device group comprises at least two terminals — 301

FIG. 3

A target terminal receives data sent by a network device — 401

The target terminal sends the data to a first device group based on indication of the network device, wherein the first device group comprises at least two terminals — 402

FIG. 4

Data Transmission Apparatus

- First Configuration Unit 503
- Sending Unit 501
- Second Configuration Unit 504
- Determining Unit 505
- Indicating Unit 502

DATA TRANSMISSION METHOD AND APPARATUS

CROSS-REFERENCE TO RELATED APPLICATION(S)

This application is a continuation application of International Application No. PCT/CN2018/071850, filed on Jan. 9, 2018, the entire disclosure of the application is hereby incorporated by reference.

TECHNICAL FIELD

The present disclosure relates to the technical field of communication, in particular to a data transmission method and apparatus, and a computer storage medium.

BACKGROUND

In a future network, there will be a large number of Internet of Things (IoT) devices. In an existing protocol, an Internet of Things device, such as a wearable device or an intelligent furniture device, is usually connected to a smart phone of an owner. This connection can be directly made through a direct interface between the two, such as a sidelink interface. When a network needs to send a message to this group of terminals (e.g. a wearable device and a smart phone), data would be sent to each terminal according to a current manner, which results in serious waste of resources.

SUMMARY

To solve the foregoing technical problem, implementations of the present disclosure provide a data transmission method and apparatus, and a computer storage medium.

An implementation of the present disclosure provides a data transmission method, which includes: sending data to a target terminal by a network device, and indicating the target terminal to send the data to a first device group, wherein the first device group includes at least two terminals.

In an implementation of the present disclosure, sending the data to the target terminal by the network device includes: sending, by the network device, the data to the target terminal on a first transmission resource, wherein the first transmission resource has at least one of following resource attributes: a logical channel, a bearer, a data stream, a protocol data unit (PDU) session, and an Internet Protocol (IP) tunnel.

In an implementation of the present disclosure, a resource attribute of the first transmission resource is used for indicating that the data are data needing to be forwarded.

In an implementation of the present disclosure, a resource attribute of the first transmission resource is used for indicating that a device group to which the data need to be forwarded is the first device group.

In an implementation of the present disclosure, the method further includes: configuring, by the network device, each device group with a corresponding transmission resource, wherein different transmission resources have different resource attributes.

In an implementation of the present disclosure, the method further includes: sending indication information to the target terminal when the network device sends the data to the target terminal, wherein the indication information is used for indicating that the data are data needing to be forwarded.

In an implementation of the present disclosure, the indication information is further used for indicating that a device group to which the data need to be forwarded is the first device group.

In an implementation of the present disclosure, the method further includes: when a first terminal performs network attachment, configuring, by the network device, the first terminal as the target terminal of the first device group, wherein the target terminal supports a data forwarding function.

In an implementation of the present disclosure, the method further includes: determining, by the network device, that the first terminal is the target terminal of the first device group based on subscription information and/or terminal capability of the first terminal, wherein the target terminal supports a data forwarding function.

In an implementation of the present disclosure, the first transmission resource is determined based on one of the following manners: determining the first transmission resource through configuration information of the network device; determining the first transmission resource through a preset protocol; and determining the first transmission resource through subscription information.

In an implementation of the present disclosure, the target terminal is a terminal in the first device group; or the target terminal is a terminal beyond the first device group.

An implementation of the present disclosure provides a data transmission method, which includes: receiving, by a target terminal, data sent by a network device; and sending, by the target terminal, the data to a first device group based on indication of the network device, wherein the first device group includes at least two terminals.

In an implementation of the present disclosure, receiving, by the target terminal, the data sent by the network device includes: receiving, by the target terminal, the data sent by the network device on a first transmission resource, wherein the first transmission resource has at least one of following resource attributes: a logical channel, a bearer, a data stream, a PDU session, and an IP tunnel.

In an implementation of the present disclosure, a resource attribute of the first transmission resource is used for indicating that the data are data needing to be forwarded.

In an implementation of the present disclosure, a resource attribute of the first transmission resource is used for indicating that a device group to which the data need to be forwarded is the first device group.

In an implementation of the present disclosure, the method further includes: receiving indication information sent by the network device after the target terminal receives the data sent by the network device, wherein the indication information is used for indicating that the data are data needing to be forwarded.

In an implementation of the present disclosure, the indication information is further used for indicating that a device group to which the data need to be forwarded is the first device group.

In an implementation of the present disclosure, sending, by the target terminal, the data to the first device group based on the indication of the network device includes: sending, by the target terminal, the data to the first device group on a second transmission resource corresponding to the first device group based on the indication of the network device.

In an implementation of the present disclosure, the second transmission resource has at least one of the following resource attributes: a physical resource on the target terminal and an interface of a terminal in the first device group; a logical channel on the target terminal and an interface of a terminal in the first device group; a bearer on the target terminal and an interface of a terminal in the first device group; a data stream on the target terminal and an interface of a terminal in the first device group; a PDU session on the target terminal and an interface of a terminal in the first device group; an IP tunnel on the target terminal and an interface of a terminal in the first device group; a physical layer identification on the target terminal and an interface of a terminal in the first device group; and a group identification of the first device group.

In an implementation of the present disclosure, the first transmission resource is determined based on one of the following manners: determining the first transmission resource through configuration information of the network device; determining the first transmission resource through a preset protocol; and determining the first transmission resource through subscription information.

In an implementation of the present disclosure, the second transmission resource is determined by the target terminal, and the method further includes: notifying, by the target terminal, the network device and each terminal in the first device group of the second transmission resource; or notifying, by the target terminal, the network device of the second transmission resource, and notifying each terminal in the first device group of the second transmission resource after the network device confirms the second transmission resource.

In an implementation of the present disclosure, a mapping relationship between the first transmission resource and the second transmission resource is determined based on one of the following manners: determining the mapping relationship between the first transmission resource and the second transmission resource through configuration information of the network device; determining the mapping relationship between the first transmission resource and the second transmission resource through a preset protocol; and determining the mapping relationship between the first transmission resource and the second transmission resource through subscription information.

In an implementation of the present disclosure, the target terminal is a terminal in the first device group; or the target terminal is a terminal beyond the first device group.

An implementation of the present disclosure provides a data transmission apparatus.

The data transmission apparatus includes: a sending unit, configured to send data to a target terminal; and an indicating unit, configured to indicate the target terminal to send the data to a first device group, wherein the first device group includes at least two terminals.

In an implementation of the present disclosure, the sending unit is configured to send the data to the target terminal on a first transmission resource, wherein the first transmission resource has at least one of following resource attributes: a logical channel, a bearer, a data stream, a PDU session, and an IP tunnel.

In an implementation of the present disclosure, the indicating unit is configured to use a resource attribute of the first transmission resource for indicating that the data are data needing to be forwarded.

In an implementation of the present disclosure, the indicating unit is configured to use a resource attribute of the first transmission resource for indicating that a device group to which the data need to be forwarded is the first device group.

In an implementation of the present disclosure, the apparatus further includes: a first configuration unit configured to configure each device group a corresponding transmission resource, wherein different transmission resources have different resource attributes.

In an implementation of the present disclosure, the indicating unit is configured to send indication information to the target terminal when the sending unit sends the data to the target terminal, wherein the indication information is used for indicating that the data are data needing to be forwarded.

In an implementation of the present disclosure, the indication information is further used for indicating that a device group to which the data need to be forwarded is the first device group.

In an implementation of the present disclosure, the apparatus further includes a second configuration unit configured to, when a first terminal performs network attachment, configure the first terminal as the target terminal of the first device group, wherein the target terminal supports a data forwarding function.

In an implementation of the present disclosure, the apparatus further includes a determining unit configured to determine that the first terminal is the target terminal of the first device group based on subscription information and/or terminal capability of the first terminal, wherein the target terminal supports a data forwarding function.

In an implementation of the present disclosure, the first transmission resource is determined based on one of the following manners: determining the first transmission resource through configuration information of the network device; determining the first transmission resource through a preset protocol; and determining the first transmission resource through subscription information.

In an implementation of the present disclosure, the target terminal is a terminal in the first device group; or the target terminal is a terminal beyond the first device group.

An implementation of the present disclosure provides a data transmission apparatus.

The data transmission apparatus includes: a receiving unit, configured to receive data sent by a network device; and a forwarding unit, configured to send the data to a first device group based on indication of the network device, wherein the first device group includes at least two terminals.

In an implementation of the present disclosure, the receiving unit is configured to receive the data sent on a first transmission resource, wherein the first transmission resource has at least one of following resource attributes: a logical channel, a bearer, a data stream, a PDU session, and an IP tunnel.

In an implementation of the present disclosure, a resource attribute of the first transmission resource is used for indicating that the data are data needing to be forwarded.

In an implementation of the present disclosure, a resource attribute of the first transmission resource is used for indicating that a device group to which the data need to be forwarded is the first device group.

In an implementation of the present disclosure, the receiving unit is further configured to receiving indication information sent by the network device, wherein the indication information is used for indicating that the data are data needing to be forwarded.

In an implementation of the present disclosure, the indication information is further used for indicating that a device group to which the data need to be forwarded is the first device group.

In an implementation of the present disclosure, the forwarding unit is configured to send the data to the first device group on a second transmission resource corresponding to the first device group based on the indication of the network device.

In an implementation of the present disclosure, the second transmission resource has at least one of following resource attributes: a physical resource on the target terminal and an interface of a terminal in the first device group; a logical channel on the target terminal and an interface of a terminal in the first device group; a bearer on the target terminal and an interface of a terminal in the first device group; a data stream on the target terminal and an interface of a terminal in the first device group; a PDU session on the target terminal and an interface of a terminal in the first device group; an IP tunnel on the target terminal and an interface of a terminal in the first device group; a physical layer identification on the target terminal and an interface of a terminal in the first device group; and a group identification of the first device group.

In an implementation of the present disclosure, the first transmission resource is determined based on one of the following manners: determining the first transmission resource through configuration information of the network device; determining the first transmission resource through a preset protocol; and determining the first transmission resource through subscription information.

In an implementation of the present disclosure, the second transmission resource is determined by the target terminal, and the apparatus further includes a notification unit.

The notification unit is configured to: notify the network device and each terminal in the first device group of the second transmission resource; or notify the network device of the second transmission resource, and notify each terminal in the first device group of the second transmission resource after the network device confirms the second transmission resource.

In an implementation of the present disclosure, a mapping relationship between the first transmission resource and the second transmission resource is determined based on one of the following manners: determining the mapping relationship between the first transmission resource and the second transmission resource through configuration information of the network device; determining the mapping relationship between the first transmission resource and the second transmission resource through a preset protocol; and determining the mapping relationship between the first transmission resource and the second transmission resource through subscription information.

In an implementation of the present disclosure, the target terminal is a terminal in the first device group; or the target terminal is a terminal beyond the first device group.

An implementation of the present disclosure provides a computer storage medium having stored thereon computer-executable indications. The computer-executable indications, when executed by a processor, implement the above data transmission methods.

In a technical solution of an implementation of the present disclosure, a network device sends data to a target terminal and indicates the target terminal to send the data to a first device group, wherein the first device group includes at least two terminals. According to a technical solution of an implementation of the present disclosure, when a network needs to send data to a device group, the data are first sent to a designated terminal (i.e. a target terminal) in the device group, and then the data are sent to other terminals in the device group in the form of a group through the designated terminal. This manner of transmitting group data through the relay does not need to send data to each terminal of the device group, thus avoiding waste of resources.

BRIEF DESCRIPTION OF DRAWINGS

The accompanying drawings described herein are provided to help further understand the present disclosure, and constitute a part of this application, and exemplary implementations and descriptions of the present disclosure are used for explaining the present disclosure, but do not constitute a limitation on the present disclosure. In the drawings.

DETAILED DESCRIPTION

To understand features and technical contents of implementations of the present disclosure in more detail, the implementation of the implementations of the present disclosure will be described in detail below with reference to the drawings, which are used for reference only and are not intended to limit the implementations of the present disclosure.

Figure 1:
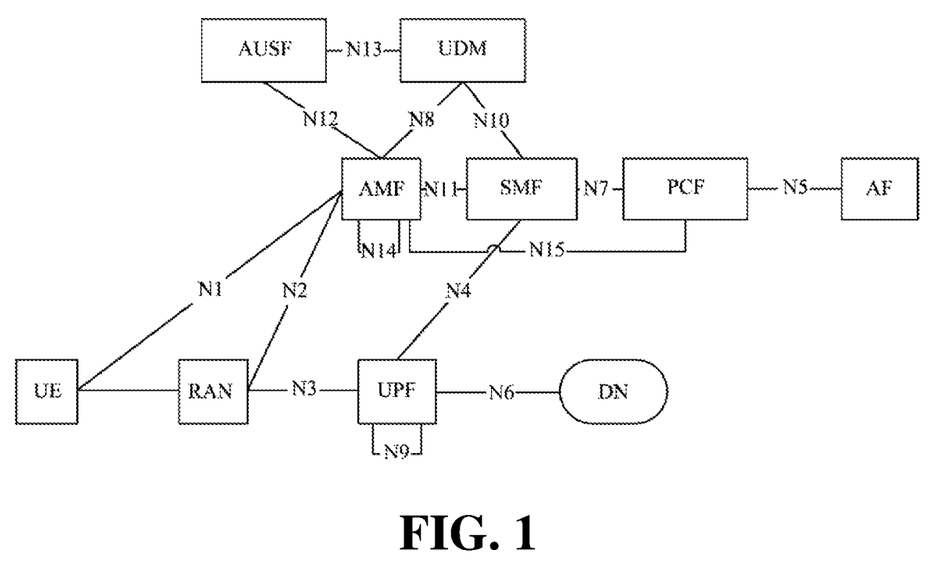
FIG. 1 is an architectural diagram of a 5G network system according to an implementation of the present disclosure.

FIG. 1 is an architectural diagram of a 5G network system according to an implementation of the present disclosure. As shown in FIG. 1, devices involved in the 5G network system include:

User Equipment (UE), a Radio Access Network (RAN), a User Plane Function (UPF), a Data Network (DN), a Core Access and Mobility Management Function (AMF), a Session Management Function (SMF), a Policy Control Function (PCF), an Application Function (AF), an Authentication Server Function (AUSF), and a Unified Data Management (UDM).

Figure 2:
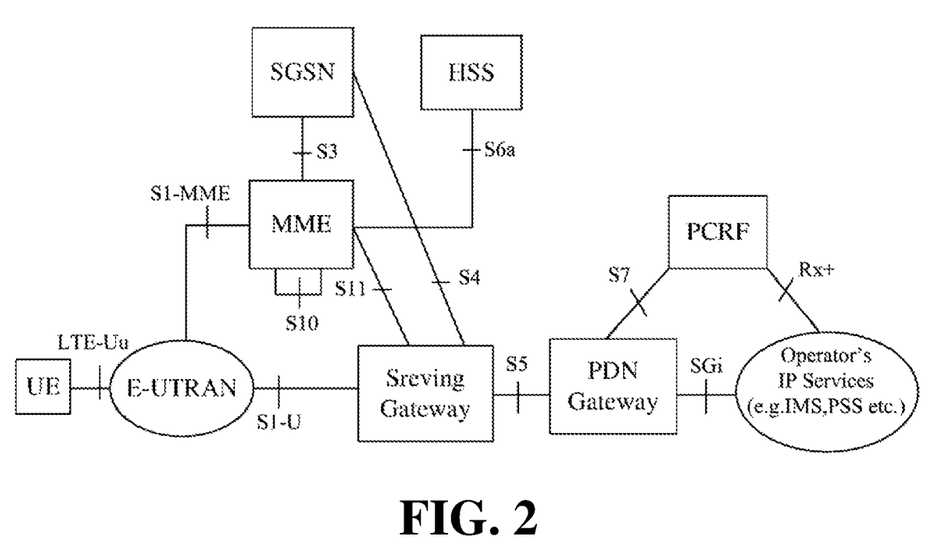
FIG. 2 is an architectural diagram of a 4G network system according to an implementation of the present disclosure.

FIG. 2 is an architectural diagram of a 4G network system according to an implementation of the present disclosure. As shown in FIG. 2, devices involved in the 4G network system include:

User Equipment (UE), an Evolved Universal Terrestrial Radio Access Network (E-UTRAN), a Mobility Management Entity (MME) network element, a Serving GPRS Support Node (SGSN), a Home Subscriber Server (HSS), a Serving Gateway, a Packet Data Network Gateway (PDN Gateway), and a Policy and Charging Rules Function (PCRF).

The above examples of FIGS. 1 and 2 are only examples of a network architecture for implementing implementations of the present disclosure, and implementations of the present disclosure are not limited to the network architecture described above in FIGS. 1 and 2.

Figure 3:
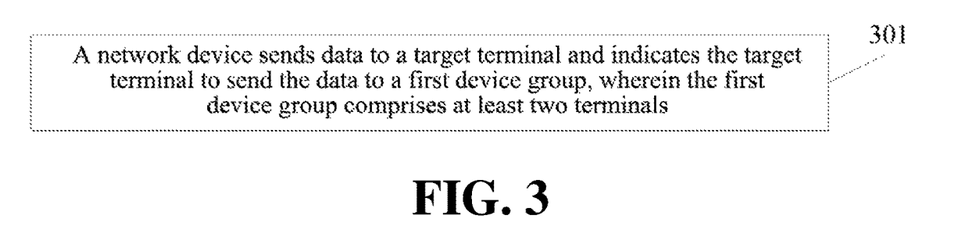
FIG. 3 is a first schematic flowchart of a data transmission method according to an implementation of the present disclosure.

FIG. 3 is a first schematic flowchart of a data transmission method according to an implementation of the present disclosure. As shown in FIG. 3, the data transmission method includes the following act 301.

Act 301: A network device sends data to a target terminal and indicates the target terminal to send the data to a first device group, wherein the first device group includes at least two terminals.

Herein, the target terminal refers to a special terminal in the first device group. The target terminal has a data forwarding function and can be called a relay terminal.

In an implementation of the present disclosure, a target terminal in a device group can be determined by the following manners:

Manner 1: When a first terminal performs network attachment, the network device configures the first terminal as the target terminal of the first device group, wherein the target terminal supports a data forwarding function.

Herein, when the first terminal is attached to the network, the network device may designate the first terminal as a target terminal of a certain device group (e.g., the first device group).

Manner 2: The network device determines that the first terminal is the target terminal of the first device group based on subscription information and/or terminal capability of the first terminal, wherein the target terminal supports a data forwarding function.

Herein, the first terminal can subscribe to be the target terminal of a certain device group (e.g., the first device group) at the time of the subscription, and the network device learns that the first terminal is the target terminal through the subscription information of the first terminal.

In an implementation of the present disclosure, the target terminal is a terminal in the first device group; or the target terminal is a terminal beyond the first device group. The device group to which the target terminal belongs is not limited to the first device group, but may also belong to another device group, such as the second device group or the third device group. It should be understood that a terminal may belong to a single device group or may belong to multiple device groups at the same time, and different device groups may have some identical terminals.

In an implementation of the present disclosure, a network device sends data to a target terminal and then indicates the target terminal to send the data to a first device group, so that the target terminal will forward the data to another terminal in the first device group after receiving the data.

In an implementation of the present disclosure, how the target terminal determines which device group (such as the first device group) is the device group the data are to be forwarded to can be implemented by the following manners:

Manner 1: The network device sends the data to the target terminal on a first transmission resource, wherein the first transmission resource has at least one of the following resource attributes: a logical channel, a bearer, a data stream, a PDU session, and an IP tunnel.

In one implementation, a resource attribute of the first transmission resource is used for indicating that the data are data to be forwarded.

In one implementation, a resource attribute of the first transmission resource is used for indicating that a device group to which the data need to be forwarded is the first device group.

In an implementation of the present disclosure, the network device configures each device group with a corresponding transmission resource, wherein different transmission resources have different resource attributes.

Manner 2: The network device sends indication information to the target terminal when sending the data to the target terminal, wherein the indication information is used for indicating that the data are data to be forwarded.

In one implementation, the indication information is further used for indicating that a device group to which the data need to be forwarded is the first device group.

Herein, the network device can indicate the target terminal through indication information that the data are data to be forwarded and that a device group to which the data need to be forwarded is the first device group. In one implementation, the indication information may be carried in the data and sent to the target terminal.

In an implementation of the present disclosure, the first transmission resource is determined based on one of the following manners: determining the first transmission resource through configuration information of the network device; determining the first transmission resource through a preset protocol; and determining the first transmission resource through subscription information.

Figure 4:
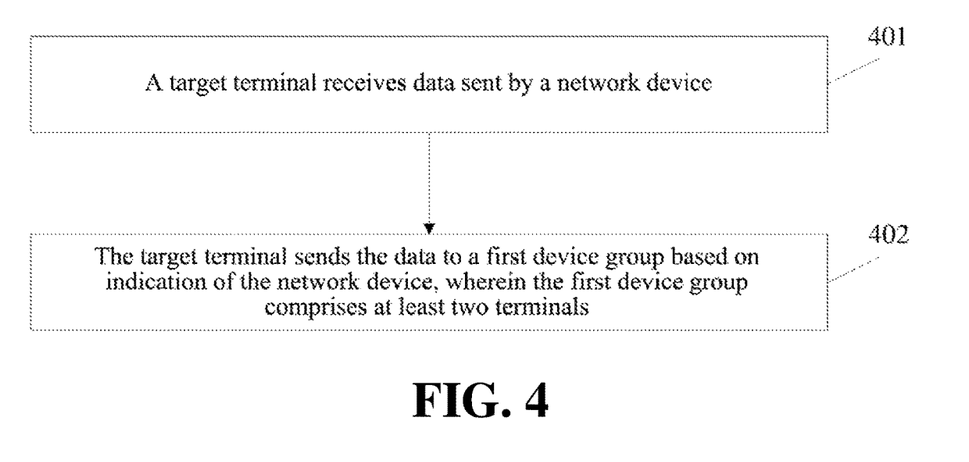
FIG. 4 is a second schematic flowchart of a data transmission method according to an implementation of the present disclosure.

FIG. 4 is a second schematic flowchart of a data transmission method according to an implementation of the present disclosure. As shown in FIG. 4, the data transmission method includes the following acts 401 and 402.

Act 401: A target terminal receives data sent by a network device.

Act 402: The target terminal sends the data to a first device group based on indication of the network device, wherein the first device group includes at least two terminals.

In an implementation of the present disclosure, the network device indicates the terminal to send the data to the first device group, and the indication may be in an implicit manner or in an explicit manner.

1) Implicit indication Manner: The target terminal receives the data sent by the network device on a first transmission resource, wherein the first transmission resource has at least one of the following resource attributes: a logical channel, a bearer, a data stream, a PDU session, and an IP tunnel.

In one implementation, a resource attribute of the first transmission resource is used for indicating that the data are data to be forwarded.

In one implementation, a resource attribute of the first transmission resource is used for indicating that a device group to which the data need to be forwarded is the first device group.

2) Explicit Indication Manner: The target terminal receives indication information sent by the network device after receiving the data sent by the network device, wherein the indication information is used for indicating that the data are data to be forwarded. In one implementation, the indication information is further used for indicating that a device group to which the data need to be forwarded is the first device group.

In an implementation of the present disclosure, the target terminal sends the data to the first device group on a second transmission resource corresponding to the first device group based on the indication of the network device.

The second transmission resource has at least one of following resource attributes: a physical resource on the target terminal and an interface of a terminal in the first device group; a logical channel on the target terminal and an interface of a terminal in the first device group; a bearer on the target terminal and an interface of a terminal in the first device group; a data stream on the target terminal and an interface of a terminal in the first device group; a PDU session on the target terminal and an interface of a terminal in the first device group; an IP tunnel on the target terminal and an interface of a terminal in the first device group; a physical layer identification on the target terminal and an interface of a terminal in the first device group; and a group identification of the first device group.

In an implementation of the present disclosure, the first transmission resource is determined based on one of the following manners: the first transmission resource is determined through configuration information of the network device; the first transmission resource is determined through a preset protocol; and the first transmission resource is determined through subscription information.

In an implementation of the present disclosure, the second transmission resource is determined by the target terminal, and the method further includes: notifying, by the target terminal, the network device and each terminal in the first device group of the second transmission resource; or notifying, by the target terminal, the network device of the second transmission resource, and notifying, by the network device, each terminal in the first device group of the second transmission resource after the network device confirms the second transmission resource.

In an implementation of the present disclosure, a mapping relationship between the first transmission resource and the second transmission resource is determined based on one of the following manners: the mapping relationship between the first transmission resource and the second transmission resource is determined through configuration information of the network device; the mapping relationship between the first transmission resource and the second transmission resource is determined through a preset protocol; and the mapping relationship between the first transmission resource and the second transmission resource is determined through subscription information.

In an implementation of the present disclosure, the target terminal is a terminal in the first device group; or the target terminal is a terminal beyond the first device group.

Figure 5:
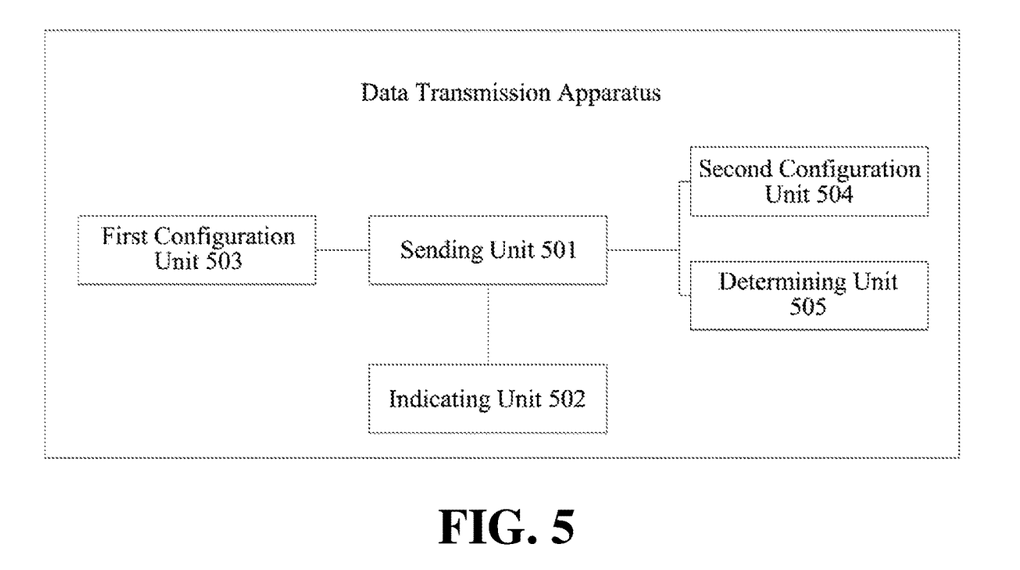
FIG. 5 is a first schematic diagram of structural composition of a data transmission apparatus according to an implementation of the present disclosure.

FIG. 5 is a first schematic diagram of structural composition of a data transmission apparatus according to an implementation of the present disclosure. As shown in FIG. 5, the data transmission apparatus includes a sending unit 501 and an indicating unit 502.

The sending unit 501 is configured to send data to a target terminal.

The indicating unit 502 is configured to indicate the target terminal to send the data to a first device group, wherein the first device group includes at least two terminals.

In one implementation, the sending unit 501 is configured to send the data to the target terminal on a first transmission resource, wherein the first transmission resource has at least one of following resource attributes: a logical channel, a bearer, a data stream, a PDU session, and an IP tunnel.

In one implementation, the indicating unit 502 is configured to use a resource attribute of the first transmission resource for indicating that the data are data to be forwarded.

In one implementation, the indicating unit 502 is configured to use a resource attribute of the first transmission resource for indicating that a device group to which the data need to be forwarded is the first device group.

In one implementation, the apparatus further includes a first configuration unit 503.

The first configuration unit 503 is configured to configure a transmission resource corresponding to each device group, wherein different transmission resources have different resource attributes.

In one implementation, the indicating unit 502 is configured to send indication information to the target terminal when the sending unit sends the data to the target terminal, wherein the indication information is used for indicating that the data are data needing to be forwarded.

In one implementation, the indication information is further used for indicating that a device group to which the data need to be forwarded is the first device group.

In one implementation, the apparatus further includes a second configuration unit 504.

The second configuration unit 504 is configured to, when a first terminal performs network attachment, configure the first terminal as the target terminal of the first device group, wherein the target terminal supports a data forwarding function.

In one implementation, the apparatus further includes a determining unit 505.

The determining unit 505 is configured to determine that the first terminal is the target terminal of the first device group based on subscription information and/or terminal capability of the first terminal, wherein the target terminal supports a data forwarding function.

In one implementation, the first transmission resource is determined based on one of the following manners: determining the first transmission resource through configuration information of the network device; determining the first transmission resource through a preset protocol; and determining the first transmission resource through subscription information.

In one implementation, the target terminal is a terminal in the first device group; or the target terminal is a terminal beyond the first device group.

Those skilled in the art should understand that the implementation functions of each unit in the data transmission apparatus shown in FIG. 5 can be understood with reference to the relevant description of the aforementioned data transmission method. The function of each unit in the data transmission apparatus shown in FIG. 5 can be implemented by a program running on a processor or by a specific logic circuit.

Figure 6:
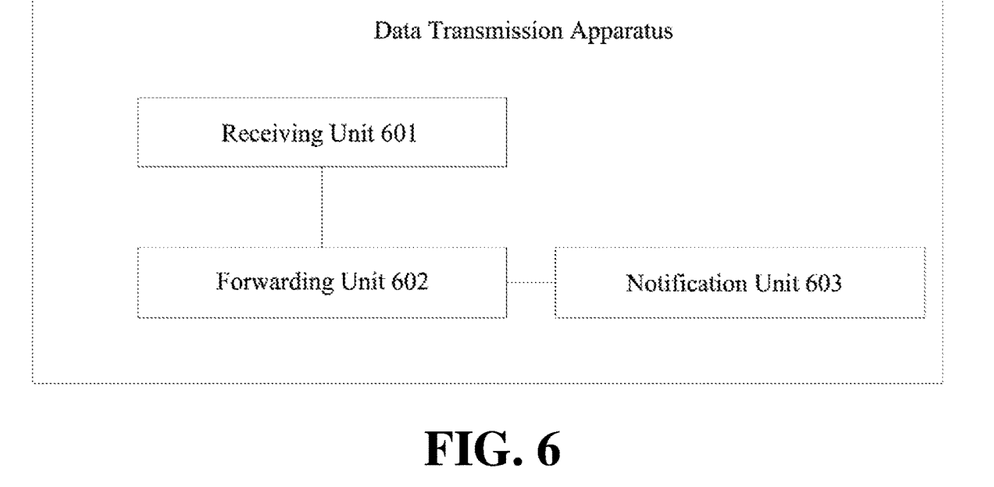
FIG. 6 is a second schematic diagram of structural composition of a data transmission apparatus according to an implementation of the present disclosure.

FIG. 6 is a second schematic diagram of structural composition of a data transmission apparatus according to an implementation of the present disclosure. As shown in FIG. 6, the data transmission apparatus includes a receiving unit 601 and a forwarding unit 602.

The receiving unit 601 is configured to receive data sent by a network device.

The forwarding unit 602 is configured to send the data to a first device group based on indication of the network device, wherein the first device group includes at least two terminals.

In one implementation, the receiving unit 601 is configured to receive the data sent on a first transmission resource, wherein the first transmission resource has at least one of the following resource attributes: a logical channel, a bearer, a data stream, a PDU session, and an IP tunnel.

In one implementation, a resource attribute of the first transmission resource is used for indicating that the data are data needing to be forwarded.

In one implementation, a resource attribute of the first transmission resource is used for indicating that a device group to which the data need to be forwarded is the first device group.

In one implementation, the receiving unit 601 is further configured to receive indication information sent by the network device, wherein the indication information is used for indicating that the data are data needing to be forwarded.

In one implementation, the indication information is further used for indicating that a device group to which the data need to be forwarded is the first device group.

In one implementation, the forwarding unit 602 is configured to send the data to the first device group on a second transmission resource corresponding to the first device group based on the indication of the network device.

In one implementation, the second transmission resource has at least one of following resource attributes: a physical resource on the target terminal and an interface of a terminal in the first device group; a logical channel on the target terminal and an interface of a terminal in the first device group; a bearer on the target terminal and an interface of a terminal in the first device group; a data stream on the target terminal and an interface of a terminal in the first device group; a PDU session on the target terminal and an interface of a terminal in the first device group; an IP tunnel on the target terminal and an interface of a terminal in the first device group; a physical layer identification on the target terminal and an interface of a terminal in the first device group; and a group identification of the first device group.

In one implementation, the first transmission resource is determined based on one of the following manners: determining the first transmission resource through configuration information of the network device; determining the first transmission resource through a preset protocol; and determining the first transmission resource through subscription information.

In one implementation, the second transmission resource is determined by the target terminal, and the apparatus further includes a notification unit 603.

The notification unit 603 is configured to: notify the network device and each terminal in the first device group of the second transmission resource; or notify the second transmission resource to the network device, which notifies each terminal in the first device group of the second transmission resource after the network device confirms the second transmission resource.

In one implementation, a mapping relationship between the first transmission resource and the second transmission resource is determined based on one of the following manners: determining the mapping relationship between the first transmission resource and the second transmission resource through configuration information of the network device; determining the mapping relationship between the first transmission resource and the second transmission resource through a preset protocol; and determining the mapping relationship between the first transmission resource and the second transmission resource through subscription information.

In one implementation, the target terminal is a terminal in the first device group; or the target terminal is a terminal beyond the first device group.

Those skilled in the art should understand that the implementation functions of each unit in the data transmission apparatus shown in FIG. 6 can be understood with reference to the relevant description of the aforementioned data transmission method. The function of each unit in the data transmission apparatus shown in FIG. 6 can be implemented by a program running on a processor or by a specific logic circuit.

The above data transmission apparatus in the implementations of the present disclosure may also be stored in a computer readable storage medium when it is implemented in the form of a software function module and sold or used as an independent product. Based on this understanding, the technical solutions in the implementations of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present disclosure. The aforementioned storage medium includes a USB flash card, a mobile hard disk, a read-only memory (ROM), a magnetic disk or an optical disk, and another media capable of storing program codes. Thus, the implementations of the present disclosure are not limited to any specific combination of hardware and software.

Correspondingly, an implementation of the present disclosure also provides a computer storage medium having stored thereon computer-executable indications. The computer-executable indications, when executed by a processor, implement the data transmission method of the implementation of the present disclosure.

Figure 7:
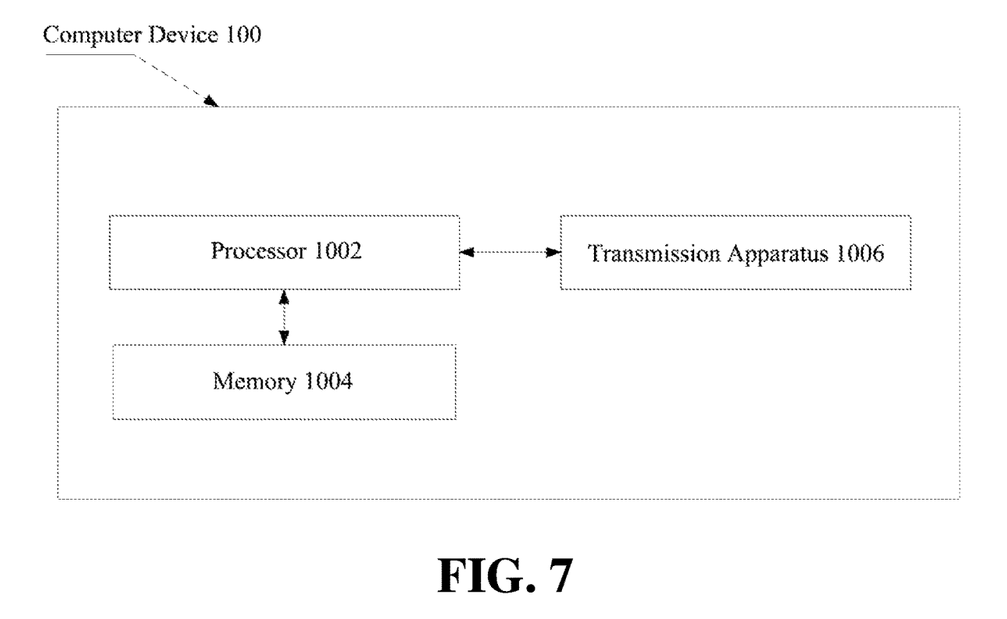
FIG. 7 is a schematic diagram of structural composition of a computer device according to an implementation of the present disclosure.

FIG. 7 is a schematic diagram of structural composition of a computer device according to an implementation of the present disclosure. The computer device may be a terminal or a network device. As shown in FIG. 7, a computer device 100 may include one or more (only one is shown in the figure) processors 1002 (the processors 1002 may include, but are not limited to, processing devices such as a Micro Controller Unit (MCU), a Field Programmable Gate Array (FPGA), etc.), a memory 1004 configured to store data, and a transmission apparatus 1006 for communication functions. One of ordinary skill in the art can understand that the structure shown in FIG. 7 is only schematic and does not limit the structure of the above electronic apparatus. For example, the computer device 100 may also include more or fewer components than shown in FIG. 7, or have a different configuration from that shown in FIG. 7.

The memory 1004 may be configured to store software programs and modules of an application software, such as program instructions/modules corresponding to a method in an implementation of the present disclosure. The processor 1002 runs the software programs and modules stored in the memory 1004 to perform various functional applications and data processing to implement the above method. The memory 1004 may include a high speed random access memory, and may further include a non-volatile memory, such as at least one magnetic disk storage device, flash memory, or another non-volatile solid-state storage device. In some examples, the memory 1004 may further include memories remotely disposed with respect to the processor 1002, and these memories may be connected to the computer device 100 through a network. Examples of the above network include, but are not limited to, the Internet, an intranet, a local area network, a mobile communication network, and combinations thereof.

The transmission apparatus 1006 is configured to receive or send data via a network. As a specific example, the network described above may include a wireless network provided by a communication provider of the computer device 100. In one example, the transmission apparatus 1006 includes a network adapter (NIC) which can be connected to other network devices through a base station so as to communicate with the Internet. In one example, the transmission apparatus 1006 may be a radio frequency module configured to communicate with the Internet wirelessly.

The technical solutions described in the implementations of the present disclosure can be combined arbitrarily if no contradiction occurs.

In several implementations provided by the present disclosure, it should be understood that the disclosed method and intelligent device may be implemented in other manners. The device implementations described above are only illustrative, for example, the division of the units is only a logical function division, and there may be other division manners in actual implementation. For example, multiple units or components may be combined or integrated into another system, or some features may be ignored or not executed. In addition, the mutual coupling or direct coupling or communication connection between various components shown or discussed may be indirect coupling or communication connection through some interface, apparatus or unit, and may be electrical, mechanical or in other forms.

The unit described as a separate component may or may not be physically separated, and the component shown as a unit may or may not be a physical unit, i.e., it may be located in one place or may be distributed over multiple network units. Some or all of the units may be selected according to practical needs to achieve a purpose of the implementations.

In addition, various functional units in various implementations of the present disclosure may be integrated in a second processing unit, or various units may be physically present separately, or two or more units may be integrated in one unit. The above-mentioned integrated units may be implemented in a form of hardware or in a form of hardware plus software functional units.

What are described above are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure.

What is claimed is:

1. A data transmission method, wherein the method comprises:
   receiving, by a target terminal, data sent by a network device on a first transmission resource, wherein the first transmission resource has at least one of the following resource attributes: a logical channel, a bearer, a data stream, a protocol data unit (PDU) session, or an Internet Protocol (IP) tunnel; and
   sending, by the target terminal, the data to all terminals in a first device group based on indication of the network device, wherein the first device group comprises at least two terminals, wherein a resource attribute of the first transmission resource is used for indicating that a device group to which the data needs to be forwarded is the first device group.

2. The method of claim 1, wherein a resource attribute of the first transmission resource is used for indicating that the data are data needing to be forwarded.

3. The method of claim 1, wherein the method further comprises:
   receiving indication information sent by the network device after the target terminal receives the data sent by the network device, wherein the indication information is used for indicating that the data are data needing to be forwarded.

4. The method of claim 3, wherein the indication information is further used for indicating that a device group to which the data need to be forwarded is the first device group.

5. The method of claim 1, wherein sending, by the target terminal, the data to the first device group based on the indication of the network device comprises:

sending, by the target terminal, the data to the first device group on a second transmission resource corresponding to the first device group based on the indication of the network device.

6. A data transmission apparatus, comprising a processor, a memory configured to store data, and a transmission device for communication functions, wherein the processor is configured to execute instructions stored in the memory to:
   send, through the transmission device, data to a target terminal on a first transmission resource, wherein the first transmission resource has at least one of following resource attributes: a logical channel, a bearer, a data stream, a PDU session, or an Internet Protocol (IP) tunnel; and
   indicate the target terminal to send the data to all terminals in a first device group, wherein the first device group comprises at least two terminals, wherein a resource attribute of the first transmission resource is used for indicating that a device group to which the data needs to be forwarded is the first device group.

7. A data transmission apparatus, comprising a processor, a memory configured to store data, and a transmission device for communication functions, wherein the processor is configured to execute instructions stored in the memory to:
   receive, through the transmission device, data sent by a network device on a first transmission resource, wherein the first transmission resource has at least one of following resource attributes: a logical channel, a bearer, a data stream, a protocol data unit (PDU) session, or an Internet Protocol (IP) tunnel; and
   send, through the transmission device, the data to all terminals in a first device group based on indication of the network device, wherein the first device group comprises at least two terminals, wherein a resource attribute of the first transmission resource is used for indicating that a device group to which the data needs to be forwarded is the first device group.

8. The apparatus of claim 7, wherein a resource attribute of the first transmission resource is used for indicating that the data are data needing to be forwarded.

9. The apparatus of claim 7, wherein the processor is further configured to receive indication information sent by the network device, wherein the indication information is used for indicating that the data are data needing to be forwarded.

10. The apparatus of claim 9, wherein the indication information is further used for indicating that a device group to which the data need to be forwarded is the first device group.

11. The apparatus of claim 7, wherein the processor is configured to send the data to the first device group on a second transmission resource corresponding to the first device group based on the indication of the network device.

12. The apparatus of claim 11, wherein the second transmission resource has at least one of the following resource attributes:
   a physical resource on the target terminal and an interface of a terminal in the first device group;
   a logical channel on the target terminal and an interface of a terminal in the first device group;
   a bearer on the target terminal and an interface of a terminal in the first device group;
   a data stream on the target terminal and an interface of a terminal in the first device group;

a PDU session on the target terminal and an interface of a terminal in the first device group;

an IP tunnel on the target terminal and an interface of a terminal in the first device group;

a physical layer identification on the target terminal and an interface of a terminal in the first device group; or a group identification of the first device group.

13. The apparatus of claim 11, wherein the second transmission resource is determined by the target terminal, and the processor is further configured to:

notify the network device and each terminal in the first device group of the second transmission resource; or notify the network device of the second transmission resource, and notify each terminal in the first device group of the second transmission resource after the network device confirms the second transmission resource.

14. The apparatus of claim 11, wherein a mapping relationship between the first transmission resource and the second transmission resource is determined based on one of the following manners:

determining the mapping relationship between the first transmission resource and the second transmission resource through configuration information of the network device;

determining the mapping relationship between the first transmission resource and the second transmission resource through a preset protocol; or determining the mapping relationship between the first transmission resource and the second transmission resource through subscription information.

15. The apparatus of claim 7, wherein the first transmission resource is determined based on one of the following manners:

determining the first transmission resource through configuration information of the network device;

determining the first transmission resource through a preset protocol; or determining the first transmission resource through subscription information.

16. The apparatus of claim 7, wherein the target terminal is a terminal in the first device group; or the target terminal is a terminal beyond the first device group.

\* \* \* \* \*